(12) United States Patent
Pan

(10) Patent No.: US 11,571,090 B2
(45) Date of Patent: Feb. 7, 2023

(54) AUTOMATIC CLEANING DEVICE OF FOOD FRYING MACHINES

(71) Applicant: O-VIEW Technology Co., Ltd., New Taipei (TW)

(72) Inventor: Chia-I Pan, New Taipei (TW)

(73) Assignee: O-VIEW TECHNOLOGY CO., LTD., New Taipei (TW)

(*) Notice: Subject to any disclaimer, the term of this patent is extended or adjusted under 35 U.S.C. 154(b) by 428 days.

(21) Appl. No.: 16/890,688

(22) Filed: Jun. 2, 2020

(65) Prior Publication Data

US 2020/0375398 A1 Dec. 3, 2020

(30) Foreign Application Priority Data

Jun. 3, 2019 (TW) .................................. 108119242

(51) Int. Cl.
*A47J 37/12* (2006.01)
*B08B 9/08* (2006.01)
*B08B 9/093* (2006.01)

(52) U.S. Cl.
CPC ......... *A47J 37/1285* (2013.01); *A47J 37/129* (2013.01); *A47J 37/1266* (2013.01); *B08B 9/0821* (2013.01); *B08B 9/093* (2013.01)

(58) Field of Classification Search
None
See application file for complete search history.

(56) References Cited

FOREIGN PATENT DOCUMENTS

CN  103126513 A  * 6/2013  .............. A47J 27/00
CN  204743697 U  * 11/2015

OTHER PUBLICATIONS

English Machine Translation for CN-204743697-U.*
English Machine Translation for CN-103126513-A.*

* cited by examiner

*Primary Examiner* — Natasha N Campbell
*Assistant Examiner* — Pradhuman Parihar
(74) *Attorney, Agent, or Firm* — Muncy, Geissler, Olds & Lowe, P.C.

(57) ABSTRACT

An automatic cleaning device of food flying machines is disclosed, wherein a food flying pot and a cleaning device are respectively installed on the machine body, the cleaning device includes a water inlet externally connected to a water source, the water inlet is connected with at least one connection tube, a water control valve is installed on the connection tube, a water outlet head is connected to the end of the connection tube, and the master controller is set up to control the water control valve, after having completed the food flying operation, the water control valve can be activated so that clean water can be sprayed into the inner flying pot through the water outlet head.

6 Claims, 19 Drawing Sheets

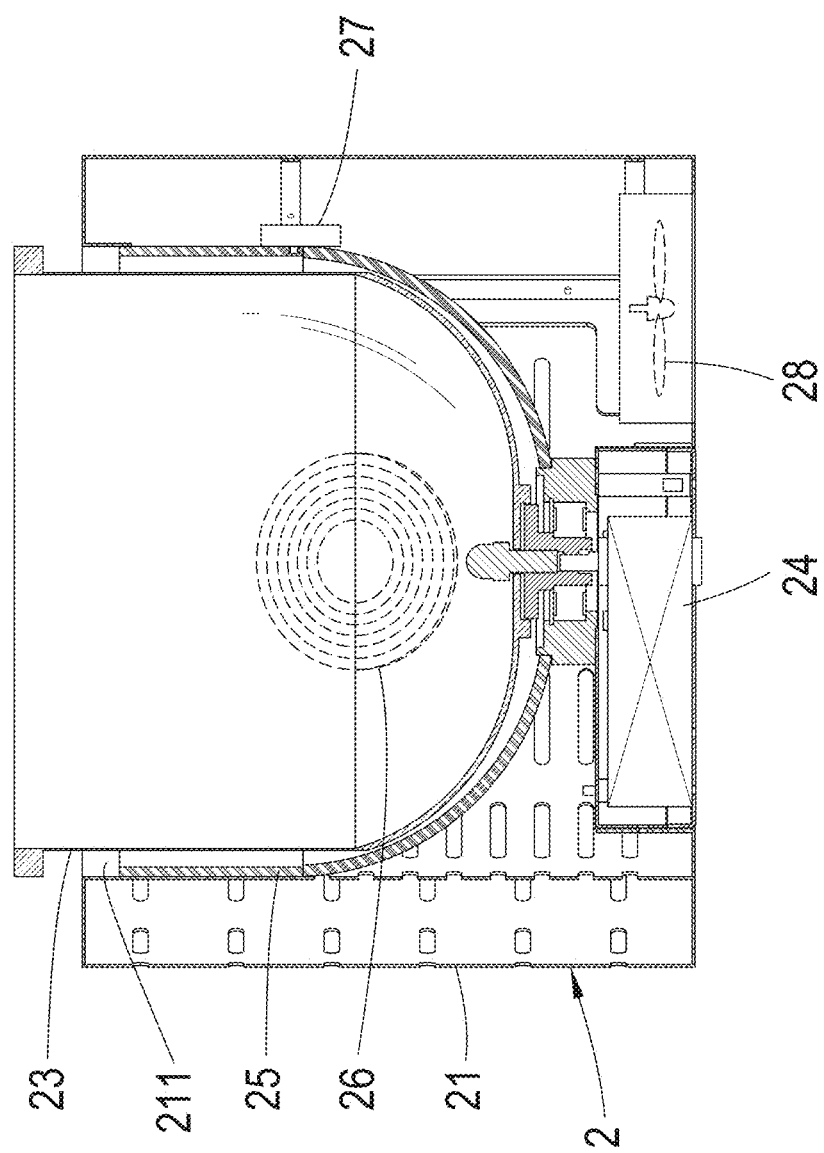

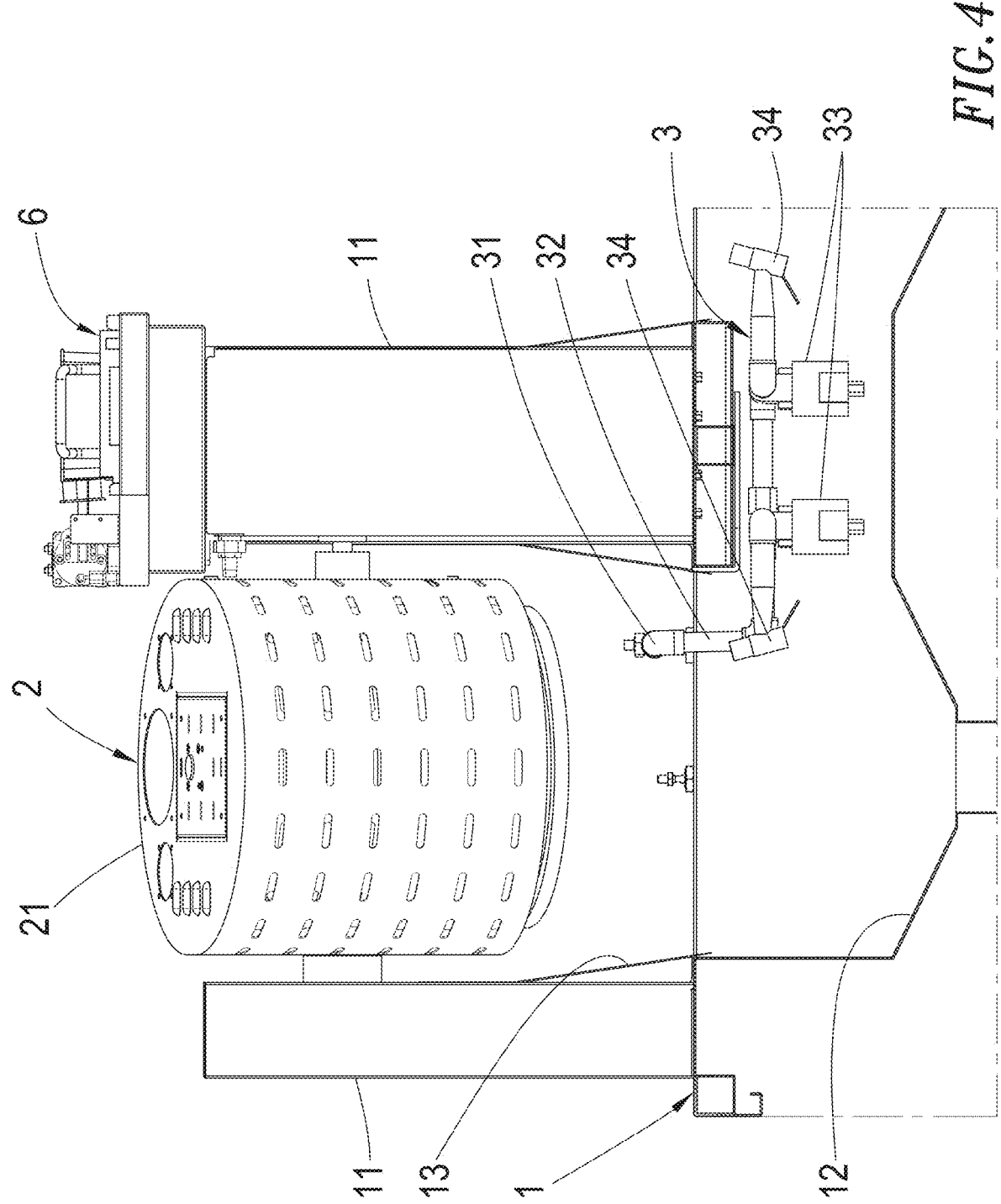

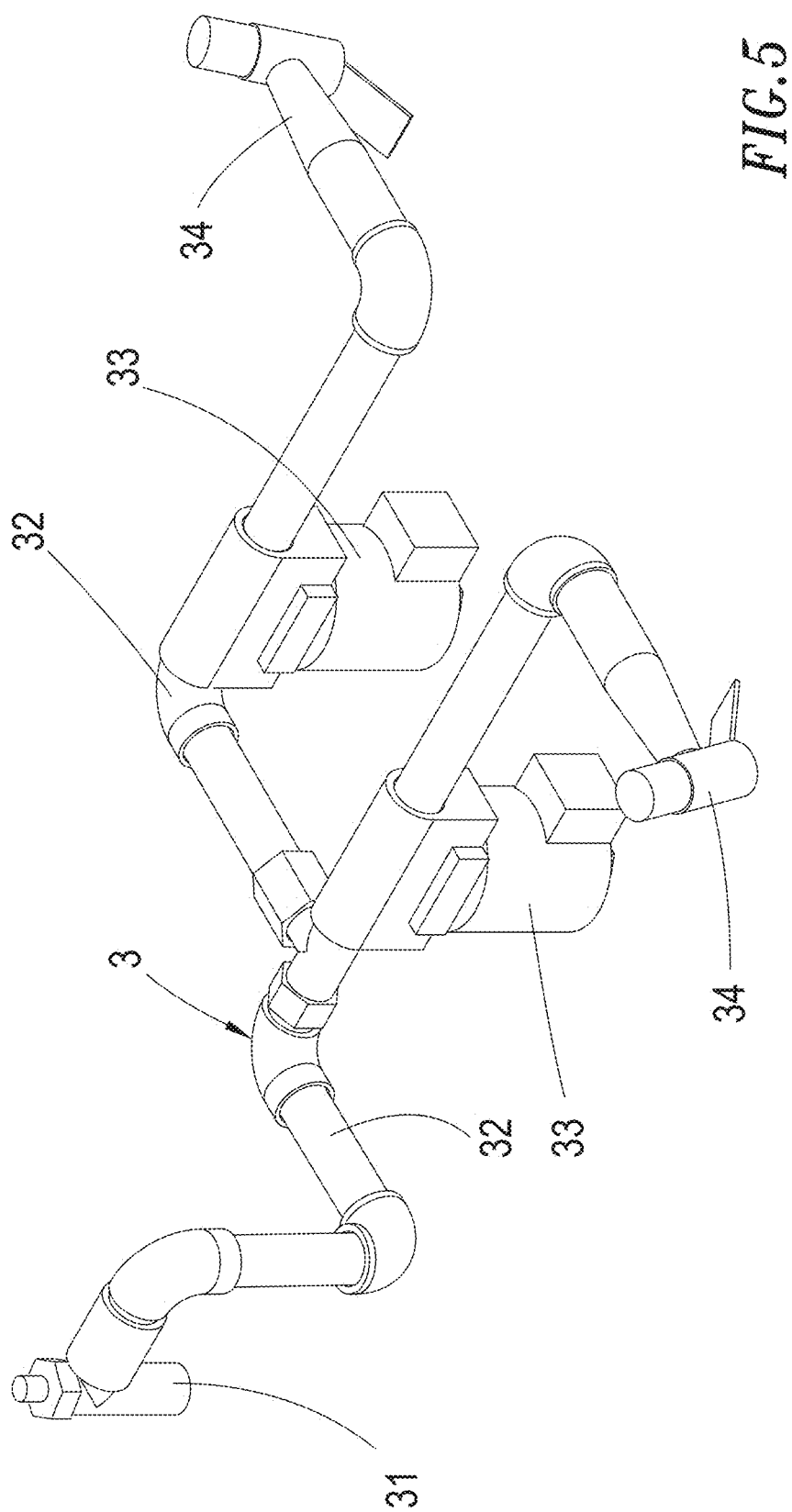

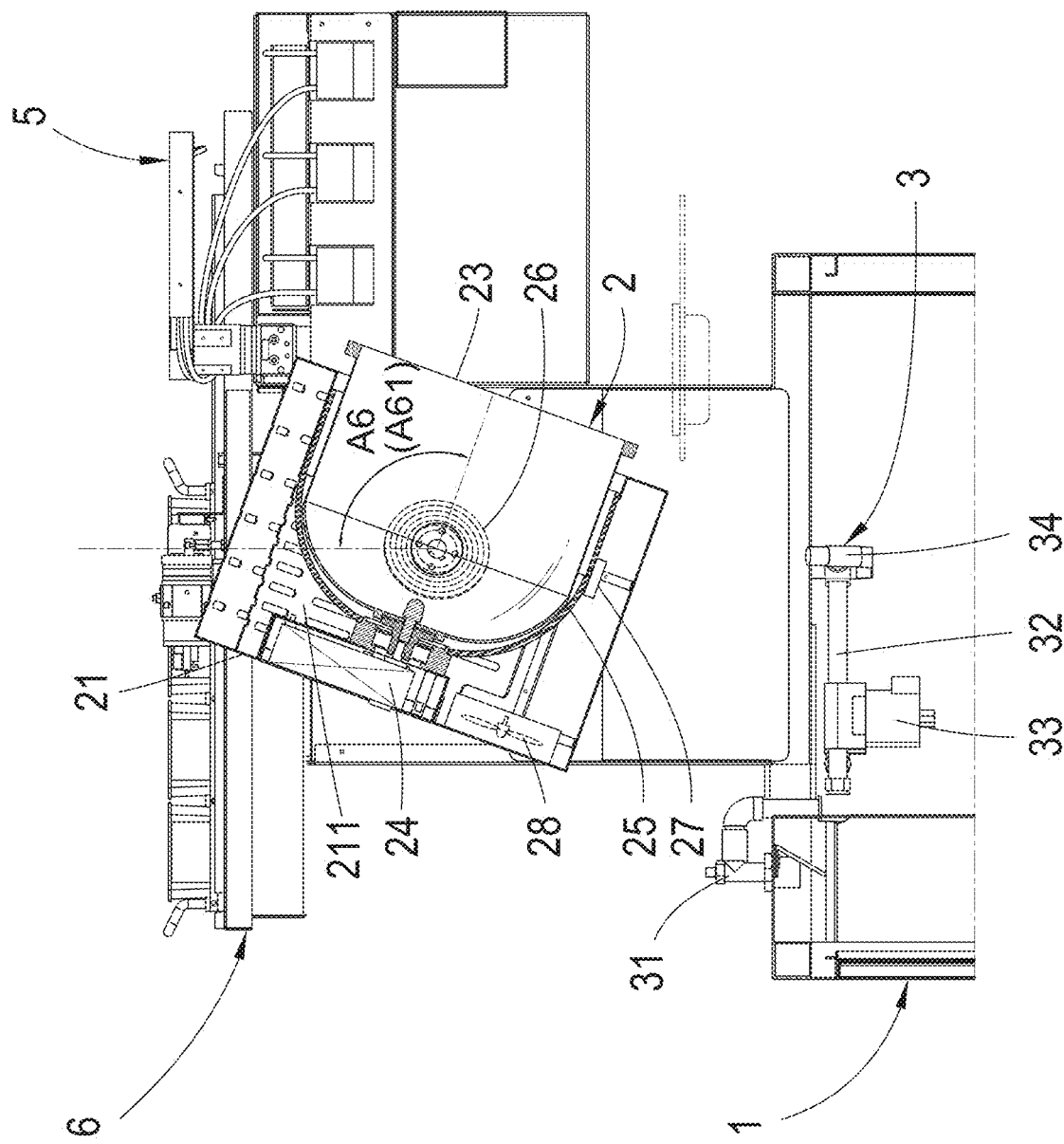

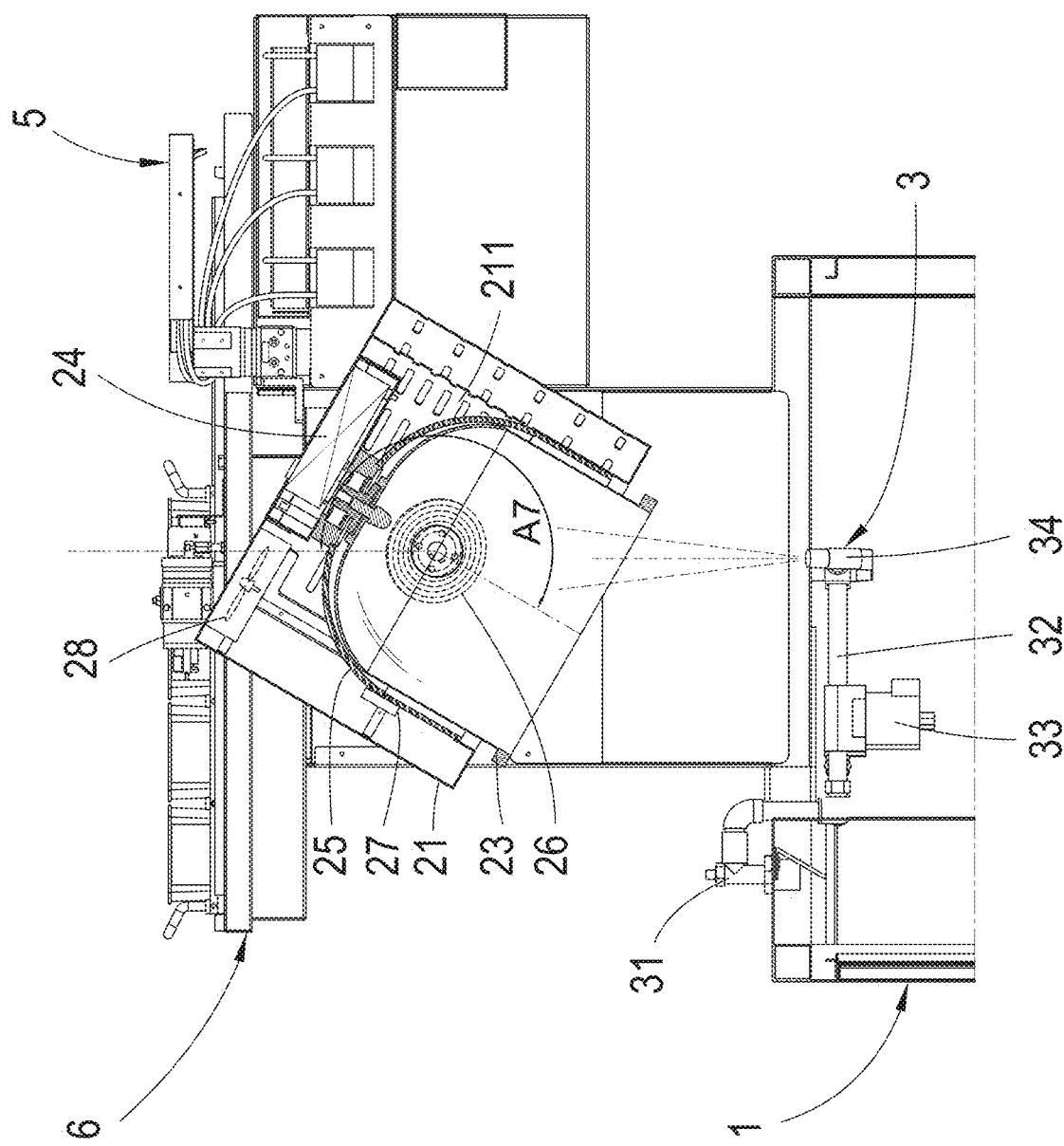

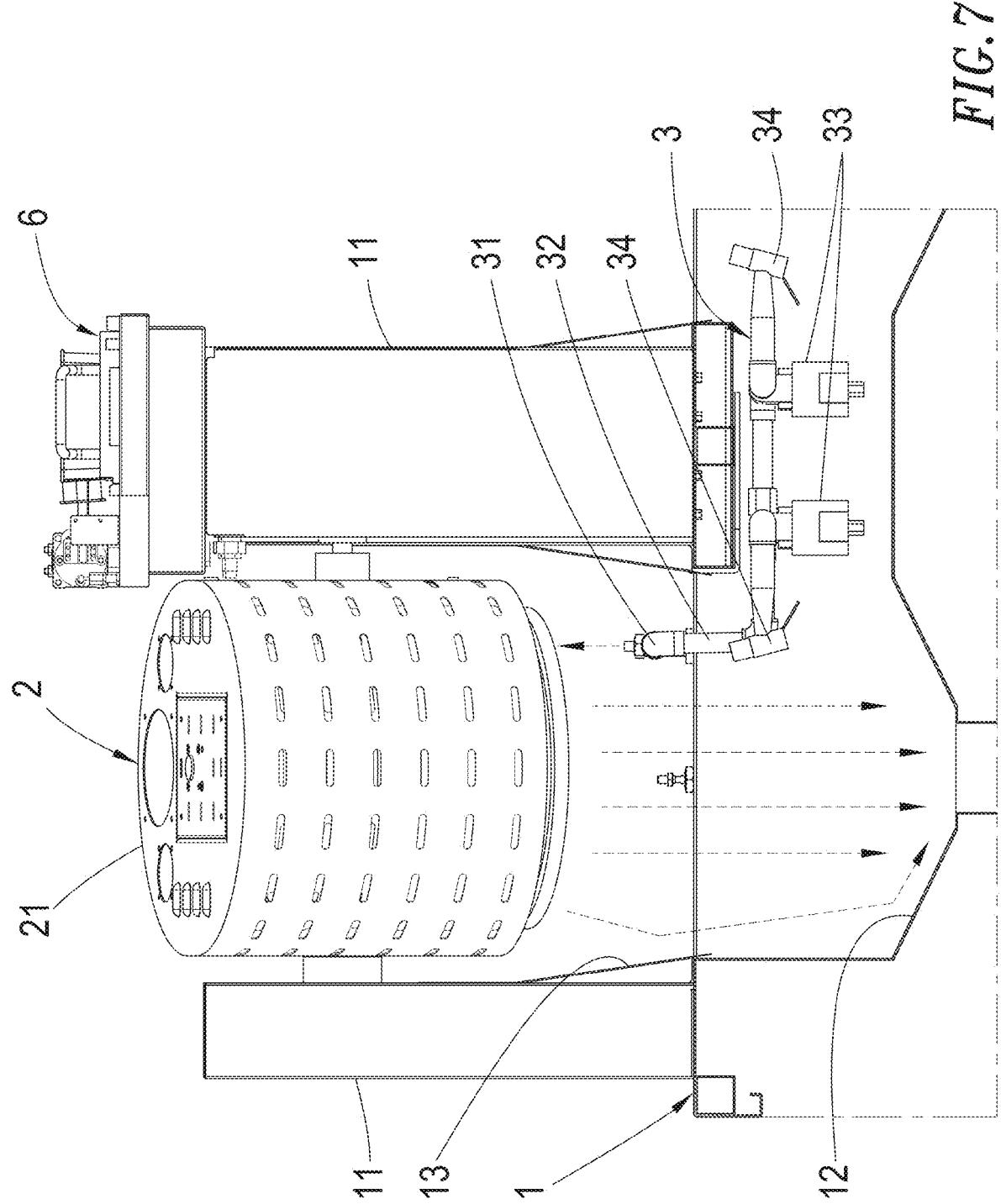

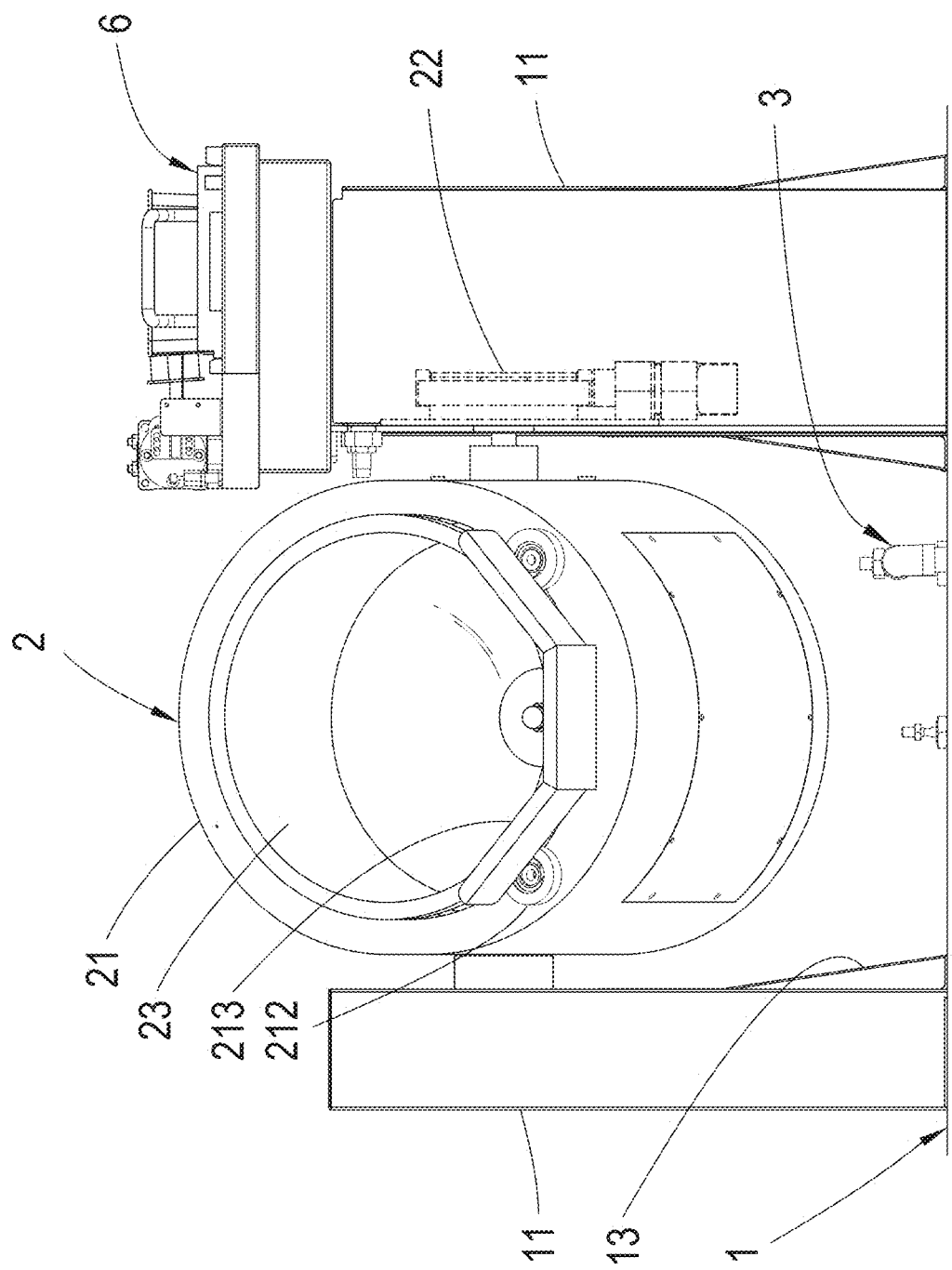

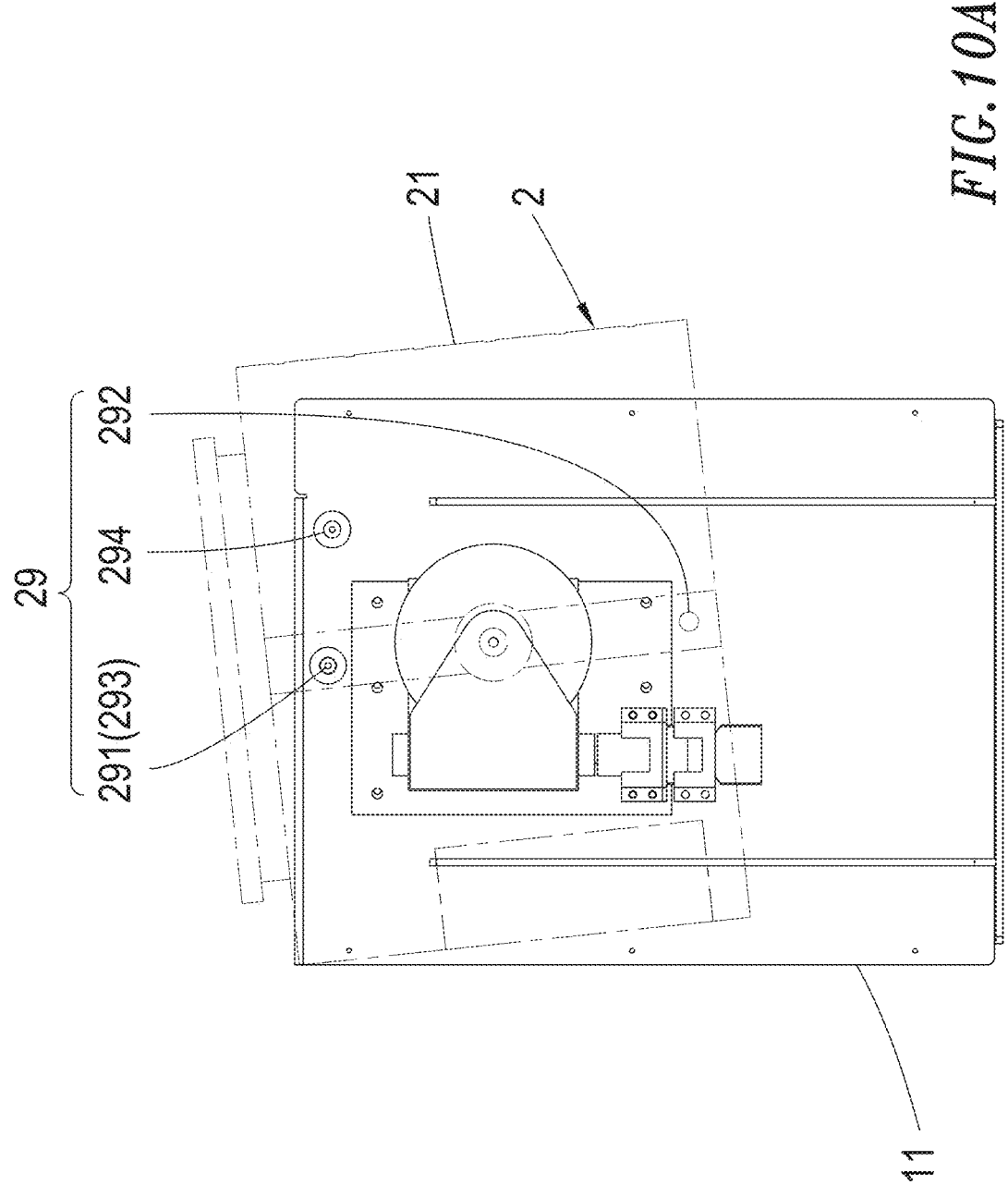

AUTOMATIC CLEANING DEVICE OF FOOD FRYING MACHINES

BACKGROUND OF THE INVENTION

1. Field of the Invention

The present invention generally relates to an automatic cleaning device for food frying machines; more specifically, it concerns an automatic or semi-automatic equipment for cooking food, and particularly, it is about an equipment structure capable of automatically cleaning food frying pots.

2. Description of Related Art

The advancements of science and technologies facilitate significant convenience to human life, and automated equipments also save lots of manpower costs and reduce technical problems which may be incurred because of human labors. In addition, as the population grows and human demands for food increase greatly, in order to ensure the stability of cooking quality, many restaurants and hotels formulate systematic protocols and processes regarding to relevant production processes from the material sources, production steps, proportion allocations, time arrangements, temperature controls and further to hardware cleaning operations. However, with respect to the hardware cleaning part, suppose it is done by manpower, there are still doubts or concerns that the cleaning results and working hours may be unstable due to different cleaning methods and habits, and the labor costs may be further increased. Therefore, in view of this, it may be possible to reduce labor costs, stabilize cleaning effectiveness and shorten required labor time in case that a set of automated equipment can be effectively applied to complete such systematic production processes.

So it is desirable to provide a food frying machine enabling automatic cleaning features, and through the controls of food stir-fly functions and the washing angles, after completing the stir-fly operation, continuous automatic cleaning can be performed at the designated angle, thus constituting the solution of automatic cleaning device according to the present invention.

SUMMARY OF THE INVENTION

An automatic cleaning device of food flying machines, comprising: a machine body, including at least one support body and at least one water sink; a food flying pot, including at least a hollow outer case body mounted on the support body, in which the outer case body is pivotally installed with a servo motor which is used to memorize an rotation angle in order to control the cleaning angle of the outer case body, and the outer case body is recessively installed with a notch from the outside toward the inside, and the interior of the notch is pivotally installed with an inner flying pot whose bottom is pivotally installed with an inner pot motor, and in which the periphery of the inner flying pot is installed with a heat-resistant support board whose outside is installed in attachment with a heating coil, a temperature sensing device and at least one radiator, and the temperature sensing device is set up to sense the temperature of the outer wall of the inner flying pot through the heat-resistant support board thereby further controlling the temperature of the inner frying pot upon heating it; a cleaning device, including a water inlet externally connected to a water source, in which the water inlet is connected with at least one connection tube, a water control valve is installed on the connection tube, a water outlet head is connected to the end of the connection tube, and the water outlet head is fixedly installed above the water sink in a way that the outlet direction of the water outlet head is upward; and a master controller, respectively connected to the servo motor, the inner pot motor, the heating coil, the temperature sensing device, the radiator as well as the water control valve.

In a preferred embodiment, the support bodies are respectively installed on the two sides above the water sink.

In a preferred embodiment, at least one blocking plate is installed correspondingly above the water sink.

In a preferred embodiment, at least two guide wheels are respectively installed on the edge of the notch opening, a guide board is further arranged on the edge of the notch opening in the outer case body, and the guide board is oppositely located between the two guide wheels.

In a preferred embodiment, the cleaning angle ranges from 205° to 215°.

In a preferred embodiment, the exterior of the outer case body is installed with a position difference sensing device connected to the master controller and applied to sense the start and end positions of the rotation of the outer case body in order to limit the outer case body to operate in this safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the support body, and the start sensing terminal and the end sensing terminal are respectively installed on a surface of the exterior of the support body in opposition to the outer case body, such that, when the outer case body rotates, if the start sensing terminal detects the start position determination block, or otherwise the end sensing terminal detects the end position determination block, then the master controller controls the servo motor to stop the rotation operation.

BRIEF DESCRIPTION OF THE DRAWINGS

FIG. 3 shows a structural cross-section view of the food flying pot in the automatic food flying machine according to the present invention.

FIG. 4 shows a structural cross-section view of the cleaning device in the automatic food flying machine according to the present invention.

FIG. 5 shows an stereo view of the cleaning device in the automatic food flying machine according to the present invention.

FIG. 6F shows a cross-section view of the automatic food flying machine according to the present invention, illustrated at its pouring angle while located at the pouring-start position.

FIG. 6H shows a cross-section view of the automatic food flying machine according to the present invention, illustrated at its cleaning angle.

FIG. 7 shows a cross-section view for implementing the cleaning process in the automatic food flying machine according to the present invention.

FIG. 8 shows a planar view of additionally installing the guild board in the automatic food flying machine according to the present invention.

FIG. 10A shows a planar view of the outer case body in the automatic food flying machine according to the present invention, illustrated at its start position.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
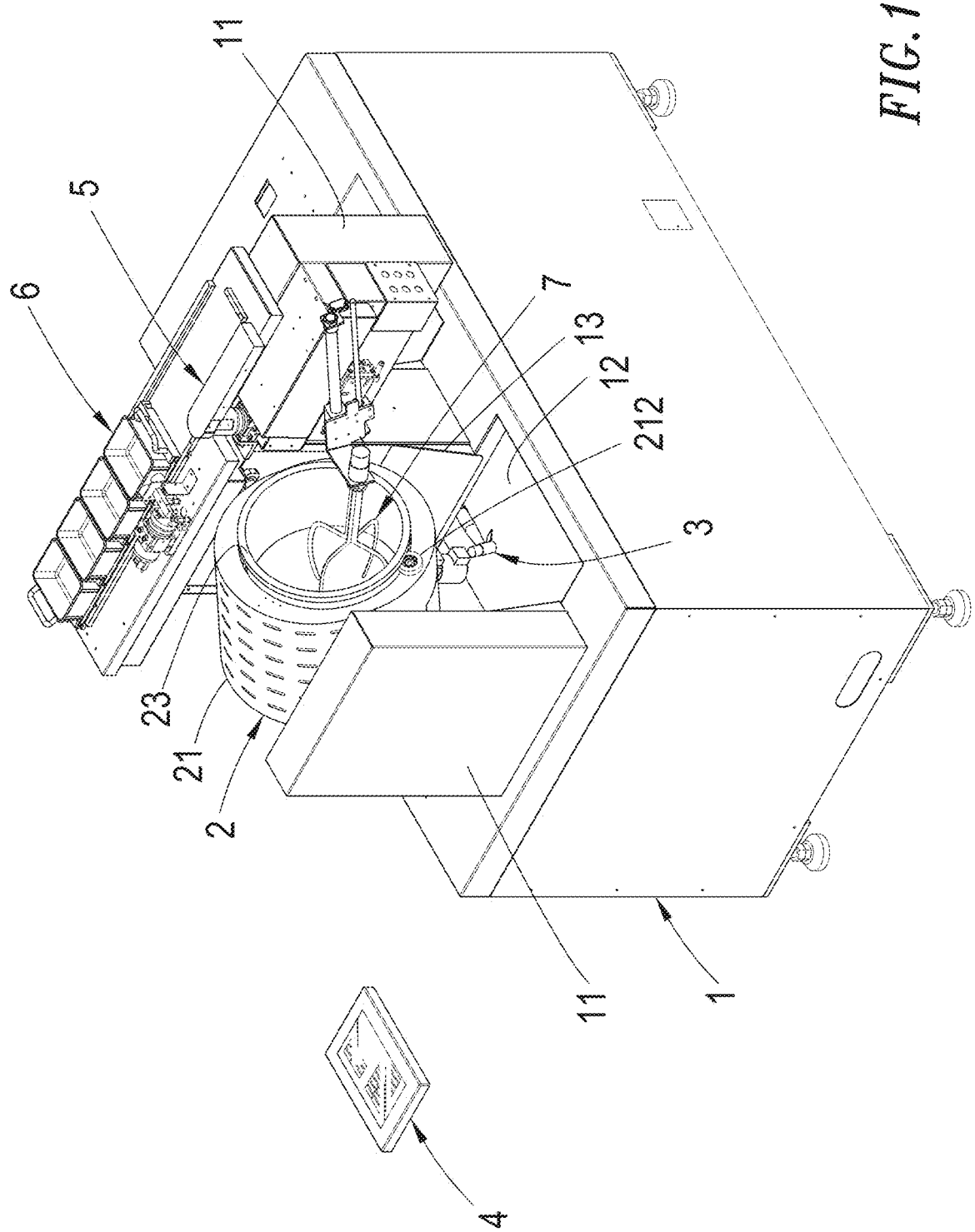
FIG. 1 shows an overall structural stereo view of the automatic food flying machine according to the present invention.
Figure 2:
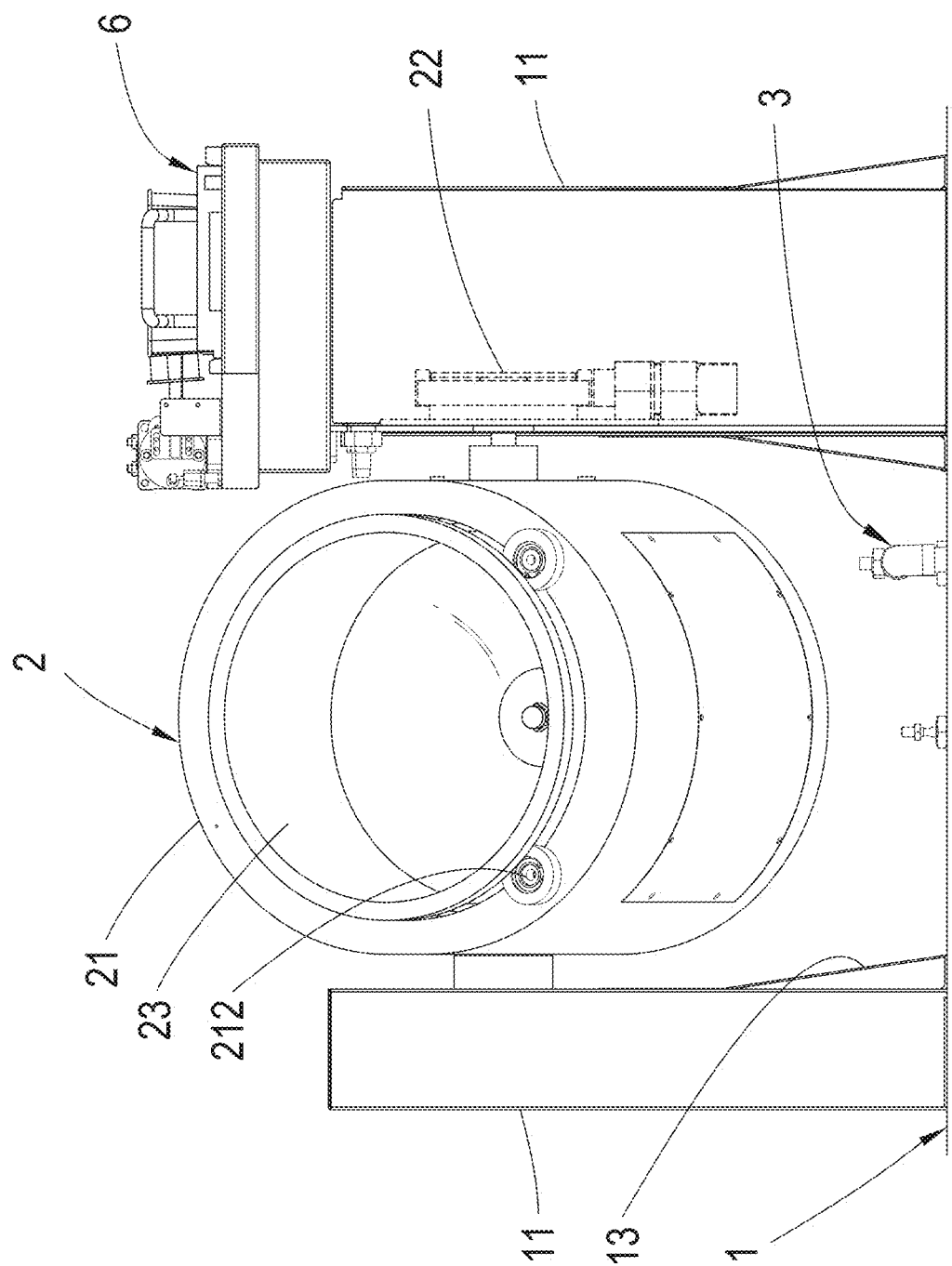
FIG. 2 shows a structural plane view of the food flying pot in the automatic food flying machine according to the present invention.

Refer first to FIGS. 1~3, wherein an overall structural stereo view and partial plane or cross-section views for the automatic cleaning device of the automatic food flying machine according to the present invention are respectively shown, and, as illustrated therein, it comprises a machine body 1, a food flying pot 2, a cleaning device 3 and a master controller 4.

Herein the machine body 1 includes at least one support body 11 and at least one water sink 12, and at least one blocking plate 13 is installed correspondingly above the water sink 12; also, in the present embodiment, the support bodies 11 are respectively installed on the two sides above the water sink 12, and the blocking plates 13 are respectively installed on the lateral sides of each of the support bodies 11 in opposition to the water sink 12.

Herein the food flying pot 2 has at least a hollow outer case body 21 mounted on the support body 11, and the outer case body 21 is pivotally configured with a servo motor 22; in the present embodiment, the servo motor 22 is installed inside the support body 11 and is used to memorize the rotation angle so as to control the working position of the outer case body 21. It can be seen that the outer case body 21 is recessively installed with a notch 211 from the outside toward the inside, and at least two guide wheels 212 are respectively installed on the edge of the opening of the notch 211; besides, the interior of the notch 211 is pivotally installed with an inner frying pot 23 whose bottom is pivotally installed with an inner pot motor 24 capable of driving the inner flying pot 23 to rotate. In the present embodiment, the inner pot motor 24 is set up at the bottom of the notch 211, and the periphery of the inner flying pot 23 is installed with a heat-resistant support board 25 made of glass materials, and the exterior of the heat-resistant support board 25 is installed in attachment with a heating coil 26, a temperature sensing device 27 and at least one radiator 28. In addition, the temperature sensing device 27 is set up to sense the temperature of the outer wall of the inner flying pot 23 through the heat-resistant support board 25 thereby further controlling the temperature of the inner flying pot 23 upon heating it.

In addition, refer conjunctively to FIGS. 1, 4 and 5, wherein the cleaning device 3 includes a water inlet 31 externally connected to a water source, the water inlet 31 is connected with at least one connection tube 32, a water control valve 33 is installed on the connection tube 32, a water outlet head 34 is connected to the end of the connection tube 32, and the water outlet head 34 is fixedly installed above the water sink 12 in a way that the outlet direction of the water outlet head 34 is upward.

Herein the master controller 4 is respectively connected to the servo motor 22, the inner pot motor 24, the heating coil 26, the temperature sensing device 27, the radiators 28 as well as the water control valve 33 so as to facilitate the controls of the operations of such components and their parameters, and automatic or manual operation modes can be appropriately selected.

Figure 6A:
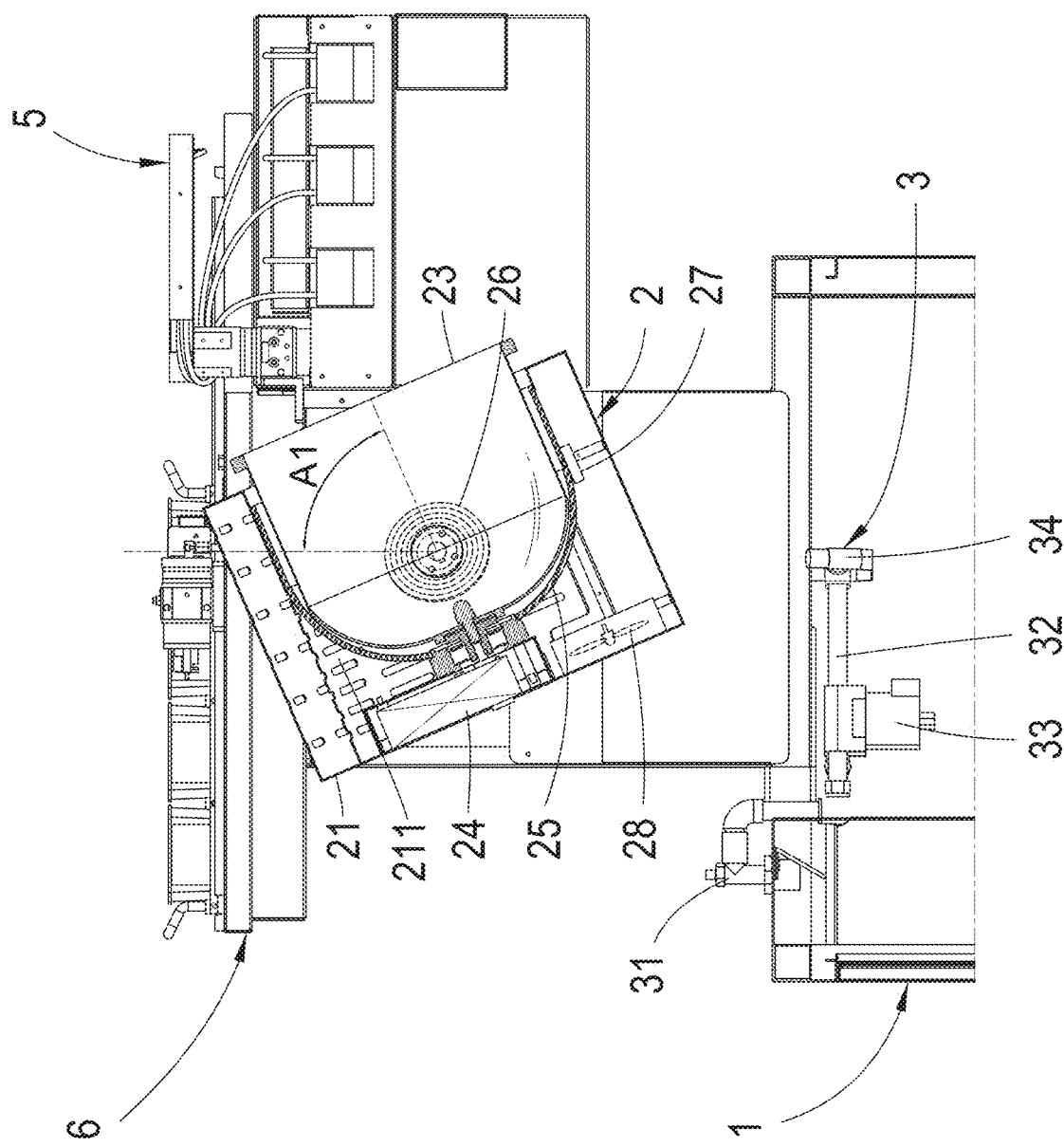
FIG. 6A shows a cross-section view of the automatic food flying machine according to the present invention, illustrated at its standby angle.
Figure 6B:
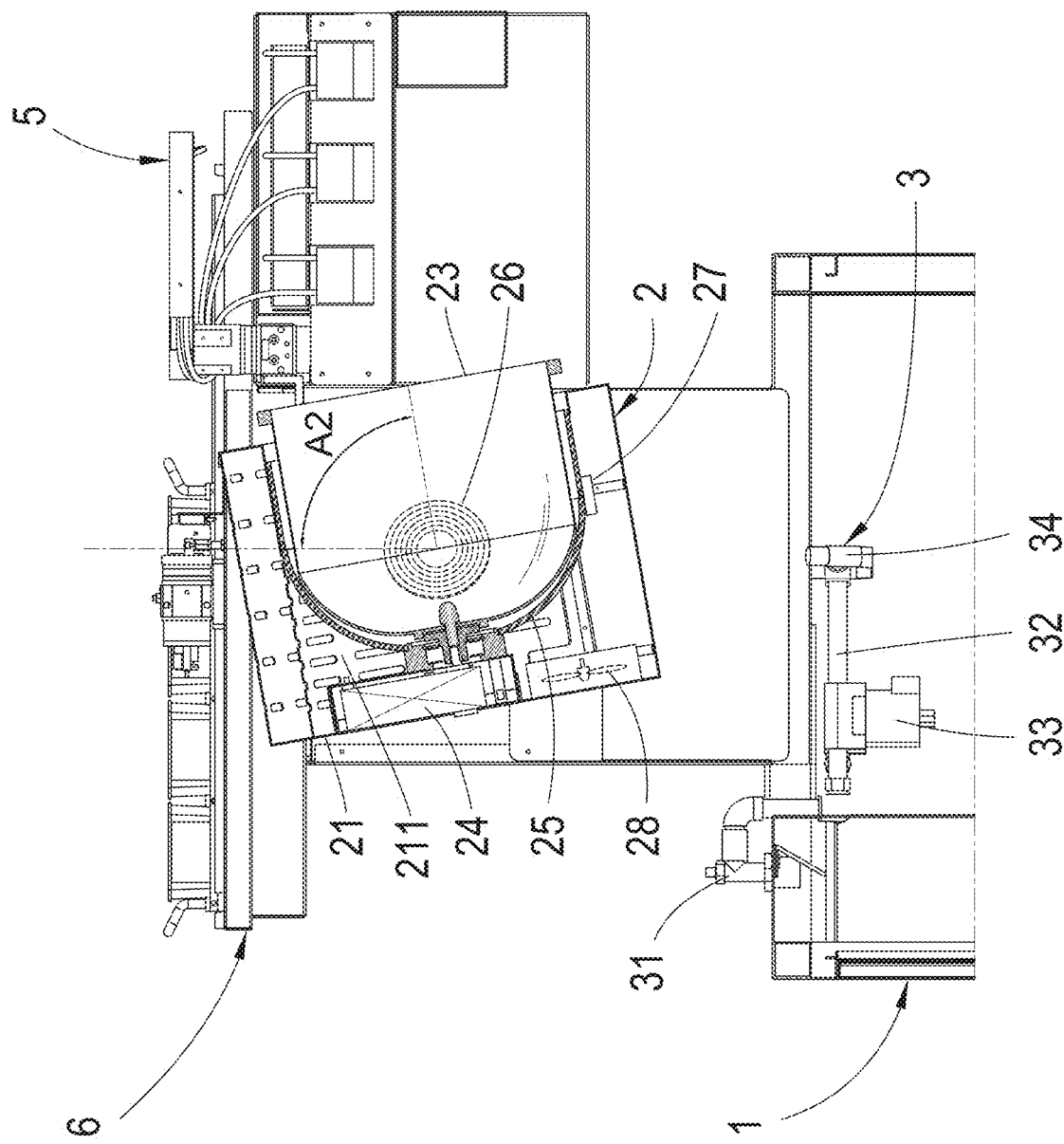
FIG. 6B shows a cross-section view of the automatic food flying machine according to the present invention, illustrated at its heating-pot angle.
Figure 6C:
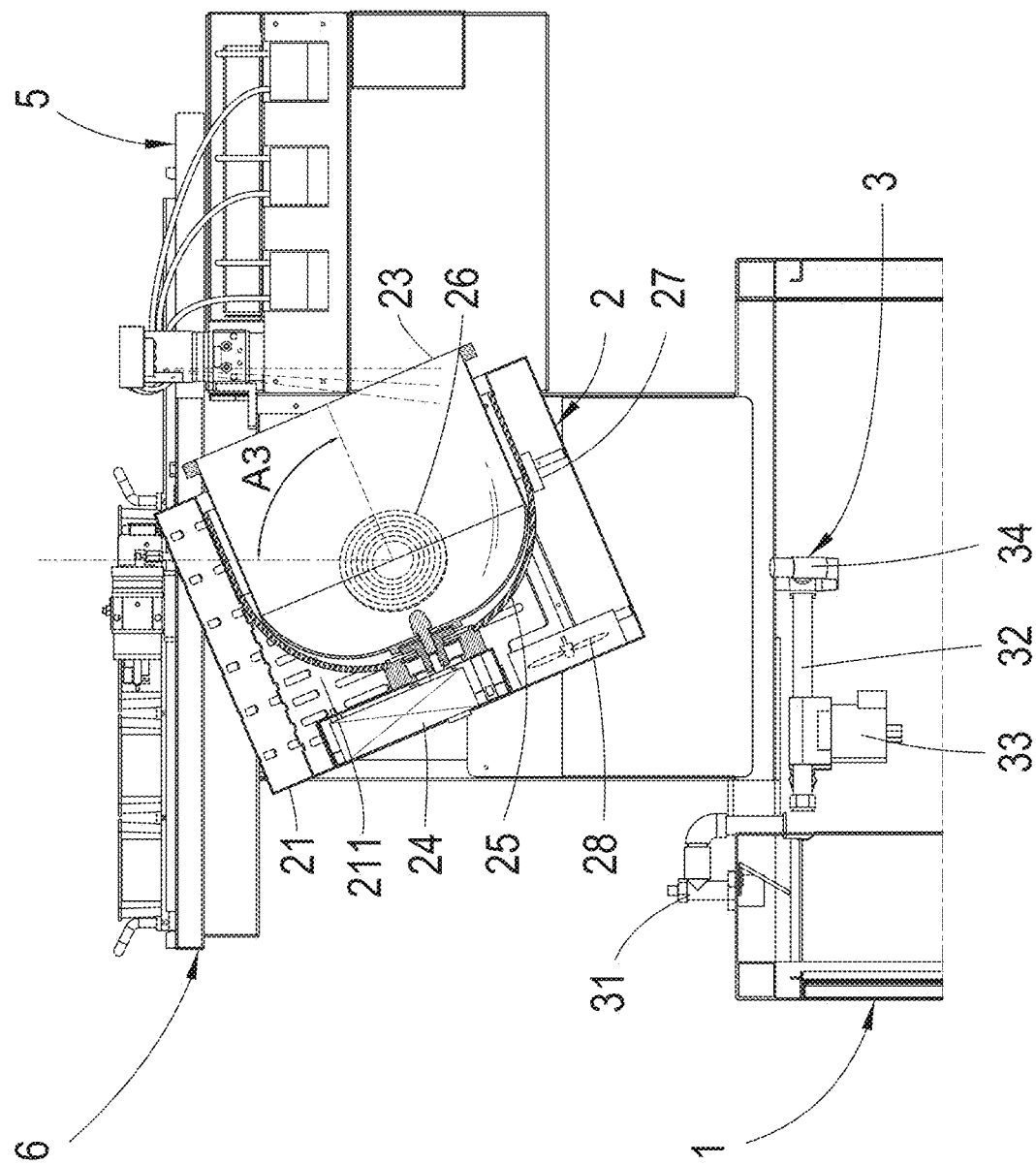
FIG. 6C shows a cross-section view of the automatic food flying machine according to the present invention, illustrated at its adding-edible-fluid angle.
Figure 6D:
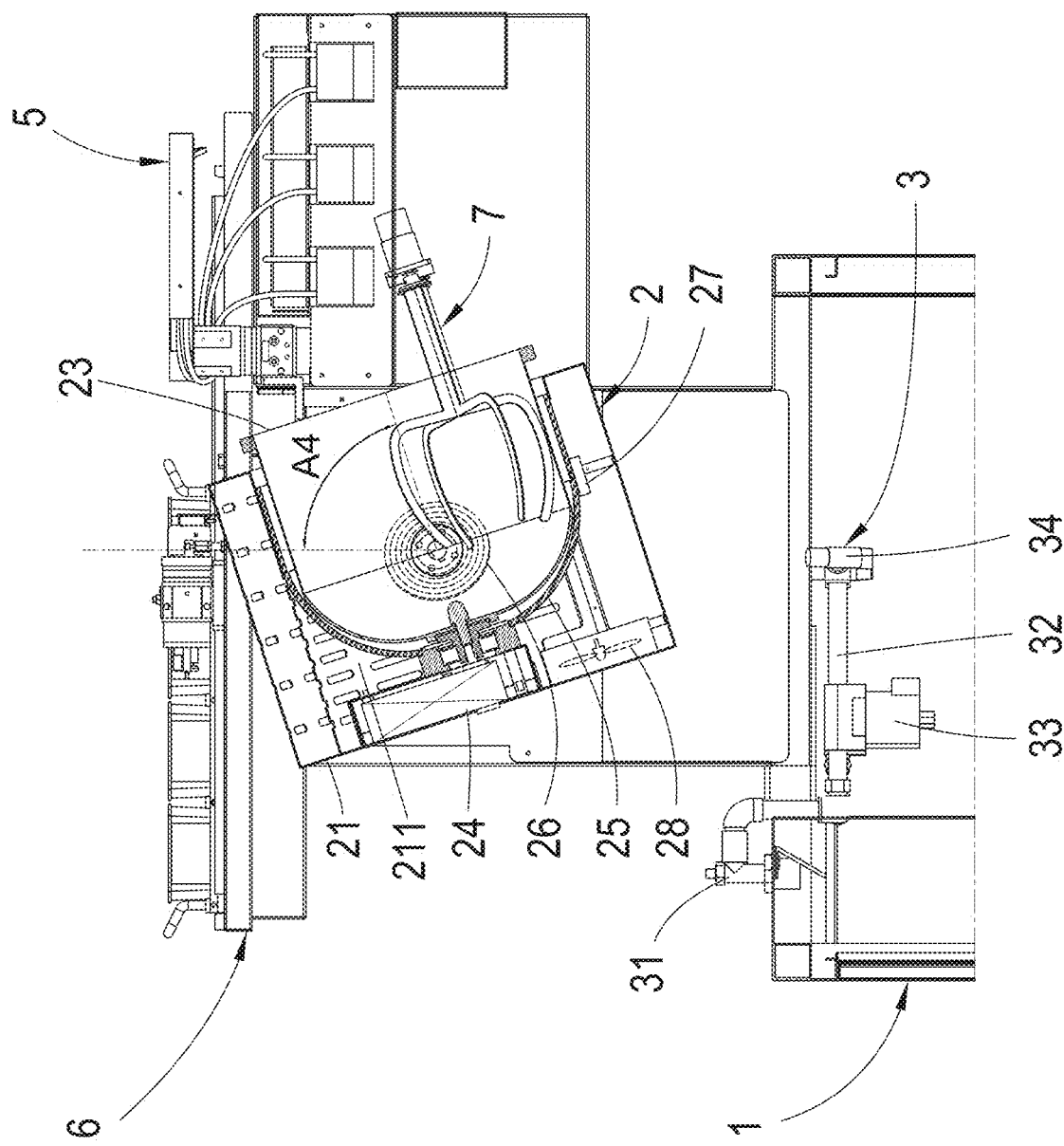
FIG. 6D shows a cross-section view of the automatic food flying machine according to the present invention, illustrated at its stir-frying angle.
Figure 6E:
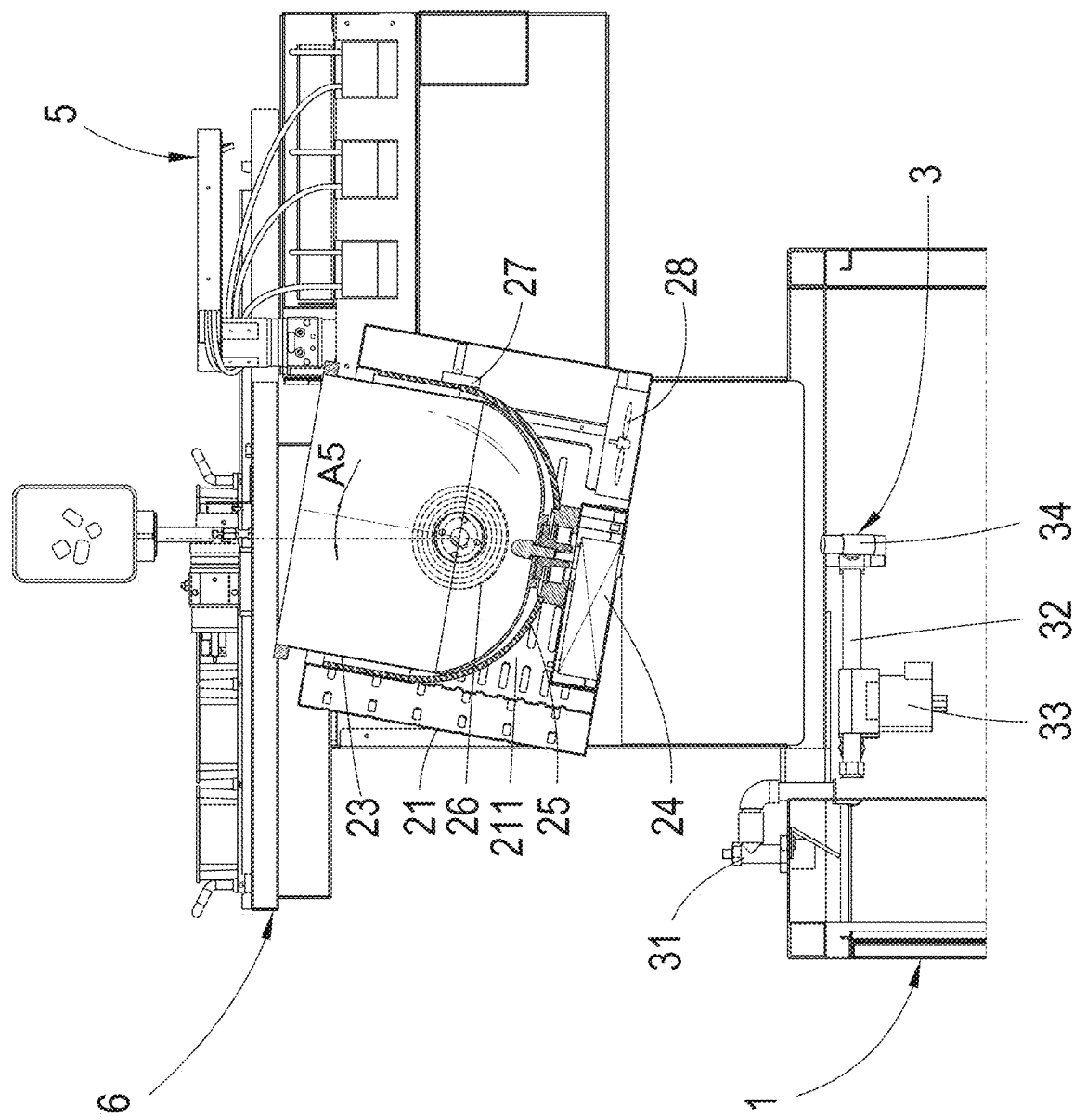
FIG. 6E shows a cross-section view of the automatic food flying machine according to the present invention, illustrated at its adding-food-material angle.

Refer to FIG. 6A, wherein the automatic cleaning device of food frying machines according to the present invention is in the standby condition, and the servo motor 22 stops the outer case body 21 at a standby angle A1 (it should be noticed that the servo motor 22 can memorize the actions of the outer case body 21 corresponding to different angle ranges, and the outer case body 21 is driven by the servo motor 22 to a predetermined angular position all the time; however, for brevity, the following paragraphs will not specifically describe that the outer case body 21 is driven by the servo motor 22.) Then, after activation, refer to FIG. 6B, the outer case body 21 is driven to turn to a heating-pot angle A2, and at this angle A2, the inner pot motor 24 and the heating coil 26 will start at the same time such that the heating coil 26 heats the inner frying pot 23 through the heat-resistant support board 25, and the inner frying pot 23 can be rotated by means of the inner pot motor 24 so that the heating can be uniform. Next, refer to FIG. 6C, when the temperature sensing device 27 detects that the inner frying pot 23 reaches a predetermined temperature, the outer case body 21 will turn to an adding-edible-fluid angle A3, in which the edible fluid may be oil, condiments or ingredients such as vinegar, sauce or egg liquid etc., and when the edible fluid is added at angle A3, the inner frying pot motor 24 and the heating coil 26 are still operating at the same time, so the oil is added into the inner frying pot 23 and then the outer case body 21 turns back to the heating-pot angle A2, such that the oil can be continuously heated evenly in the inner frying pot 23, and when the temperature sensing device 27 detects that the inner frying pot 23 and the oil have reached a predetermined temperature, the process of heating the pot is completed. Next, the outer case body 21 is turned to the adding-edible-fluid angle A3 thereby adding the required seasoning in accordance with the needs of the cooking preparations. Take fried rice as an example, after adding the egg liquid, refer to FIG. 6D, wherein the outer case body 21 is turned to a stir-frying angle A4 to fry the egg, and after frying for a predetermined duration of time, referring to FIG. 6E, the outer case body 21 is turned to an adding-material angle A5 to add ingredient materials such as rice and other auxiliary ingredients, and then returns to the stir-frying angle A4 to stir the added rice and egg (it should be appreciated that the details concerning such adding, stir-frying and other operations may be set by the user, which belongs to the technology outside the field of the present invention, so the present embodiment is simply exemplary for brief illustrations). Subsequently, referring to FIGS. 6F and 6G, when the fried rice is completed, the outer case body 21 will be turned to a pouring angle A6 to pour the fried rice into a container. Finally, referring to FIGS. 6H and 7, the outer case body 21 will be turned to a cleaning angle A7, and the inner frying pot 24 is still operating at this cleaning angle A7. Then, the water control valve 33 is activated through the servo motor 22, so that clean water can be sprayed into the inner frying pot 23 by way of the water outlet head 34, and the inner frying pot 23 is rotated to facilitate washing the inner frying pot 23; also, the blocking plates 13 can effectively block the water splashed outwards, and the used water flowing down after washing will be discharged via the water sink 12.

Referring next to FIGS. 1, 6C, 6D and 6E, the automatic cleaning device of food frying machines according to the present invention can be further conjunctively applied with an edible fluid adding device 5, a material adding device 6 and a food frying utensil 7. The edible fluid adding device 5 is used for drawing the edible fluid held in the container (which may be any seasoning or ingredients such as oil, vinegar, sauce or egg liquid, etc.) when the outer case body 21 is located at the adding-edible-fluid angle A3 so as to add it into the inner frying pot 23 to facilitate the addition of materials, seasonings or ingredients into the inner frying pot 23. The material adding device 6 is used to turn the container containing food materials above the inner frying pot 23 when the outer case body 21 is located at the adding-material angle A5 so as to facilitate the addition of materials into the inner frying pot 23. In addition, when the outer case body 21 is located at the stir-flying angle A4, the food flying utensil 7 can be applied to enter into the inner flying pot 23 to stir-fry food.

Figure 6G:
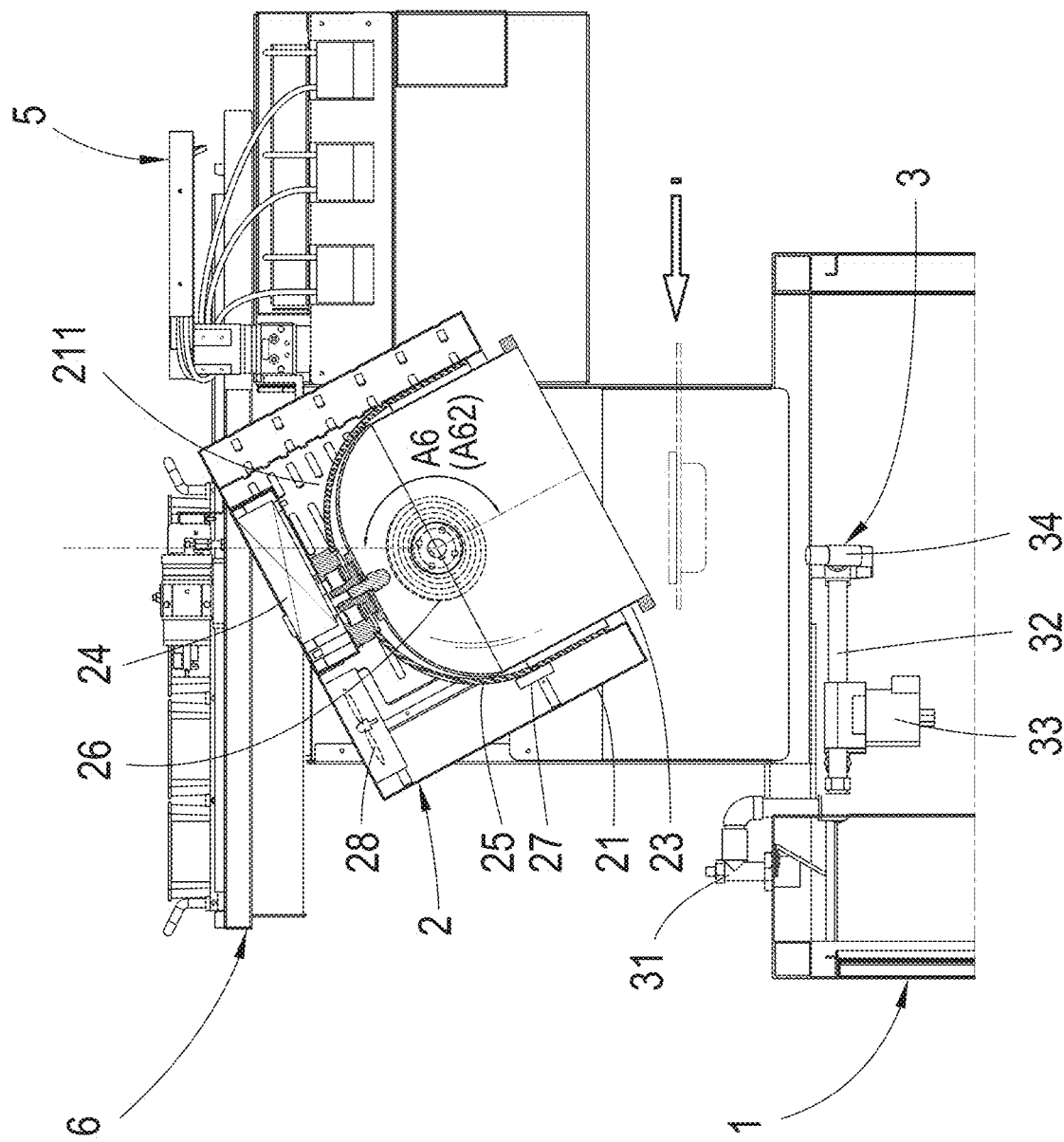
FIG. 6G shows a cross-section view of the automatic food flying machine according to the present invention, illustrated at its pouring angle while located at the pouring-end position.
Figure 9:
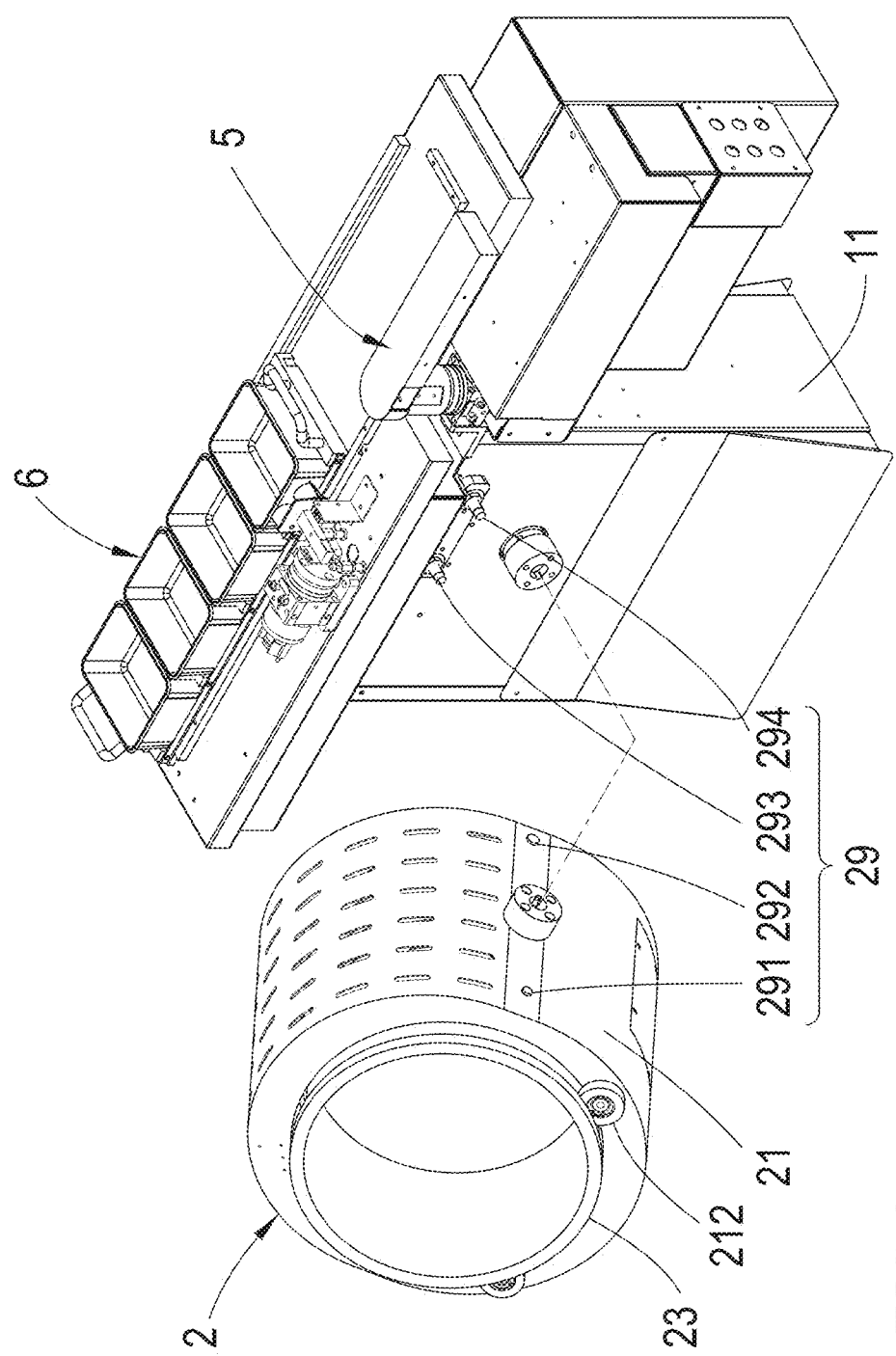
FIG. 9 shows a stereo disassembled view of additionally installing the position difference sensing device in the automatic food flying machine according to the present invention.
Figure 10B:
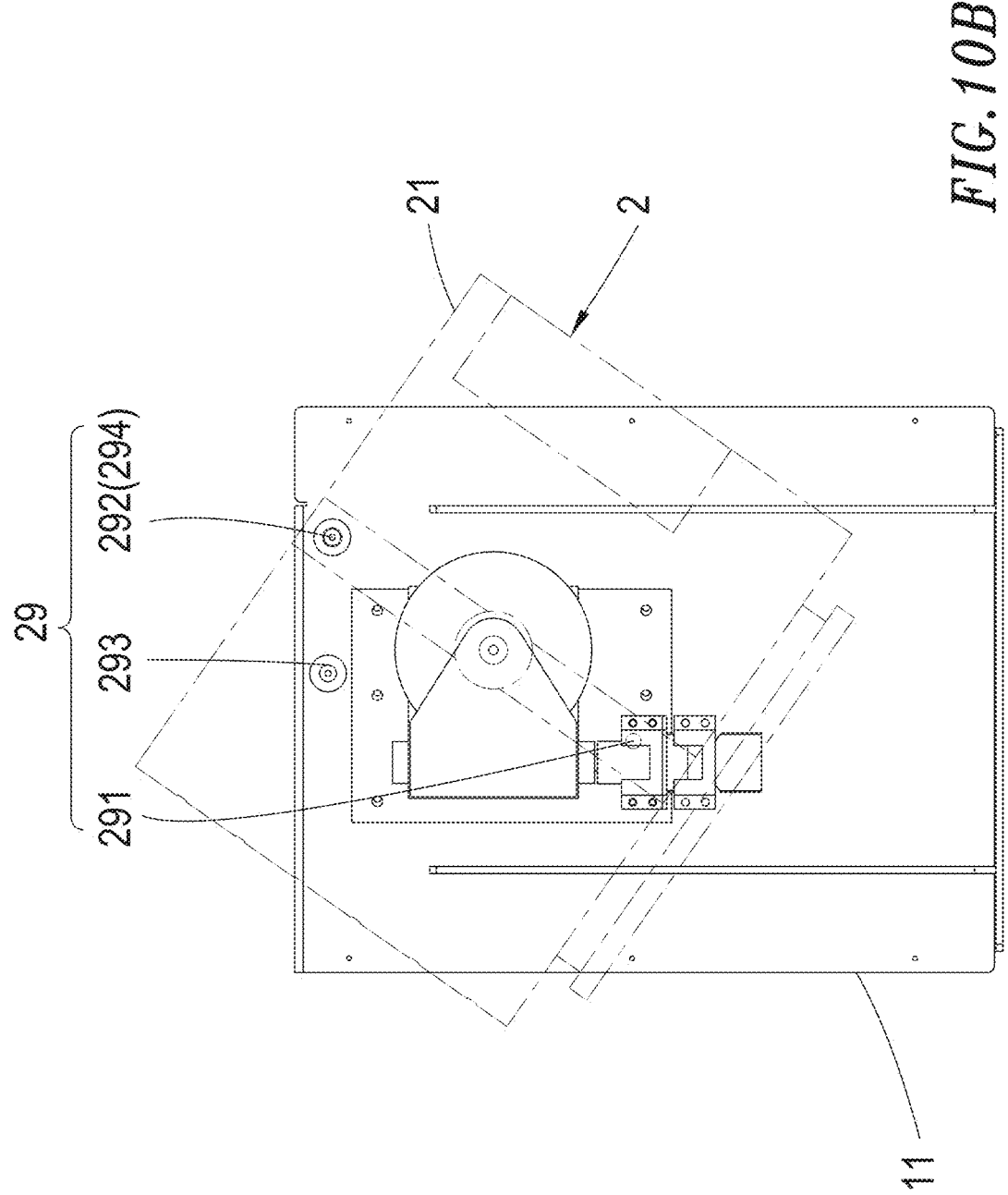
FIG. 10B shows a planar view of the outer case body in the automatic food flying machine according to the present invention, illustrated at its end position.

Referring to FIGS. 6F and 6G, in the automatic cleaning device of the food flying machine according to the present invention, the pouring angle A6 can be separately configured with a pouring-start position A61 and a pouring-end position A62, so that, upon performing the pouring action, the outer case body 21 will take priority over the pouring-start position A61, and the container for holding the prepared food will be correspondingly placed under the opening of the inner flying pot 23, and then the outer case body 21 will continue to rotate to the pouring-end position A62, and the container for holding the food is also moved together so as to receive the sequentially poured food.

Also refer to FIGS. 6A, 6B, 6C, 6D, 6E, 6F, 6G, and 6H, the following table illustrates the memory in the servo motor 22 for the outer case body 21 being located at various angle ranges in terms of different operation demands, in which each angle includes the standby angle A1, the heating-pot angle A2, the adding-edible-fluid angle A3, the stir-frying angle A4, the adding-food-material angle A5, the pouring-angle A6 and the cleaning angle A7, and each angle is calculated with respect to the outer case body 21 arranged in a vertical state as 0 degree; the list of actions corresponding to each angle is shown below:

| Symbol | Range of Angle | Best Angle | Action |
|---|---|---|---|
| A1 | 61.5°, 62.5°, 63.5°, 64.5°, 65.5°, 66.5°, 67.5°, 68.5°, 69.5°, 70.5°, 71.5° | 66.5° | Standby |
| A2 | 75°, 76°, 77°, 78°, 79°, 80°, 81°, 82°, 83°, 84°, 85° | 80° | Heating-Pot |
| A3 | 62°, 63°, 64°, 65°, 66°, 67°, 68°, 69°, 70°, 71°, 72° | 67° | Adding-Edible-Fluid |
| A4 | 67°, 68°, 69°, 70°, 71°, 72°, 73°, 74°, 75°, 76°, 77° | 72° | Stir-Frying |
| A5 | 5°, 6°, 7°, 8°, 9°, 10°, 11°, 12°, 13°, 14°, 15° | 10° | Add-Food-Material |
| A6 | 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152° | | Pouring |
| A61 | 110°, 111°, 112°, 113°, 114°, 115°, 116°, 117°, 118°, 119°, 120° | 110° | Pouring-Start Position |
| A62 | 142°, 143°, 144°, 145°, 146°, 147°, 148°, 149°, 150°, 151°, 152° | 152° | Pouring-End Position |
| A7 | 205°, 206°, 207°, 208°, 209°, 210°, 211°, 212°, 213°, 214°, 215° | 210° | Cleaning |

Furthermore, referring to FIG. 8, in the automatic cleaning device of the food flying machine according to the present invention, a guide board 213 may be further installed at the edge of the opening of the notch 211 in the outer case body 21 and is oppositely located between the two guide wheels 212.

Now refer to FIGS. 1, 2, 9, 10A and 10B, wherein, in the automatic cleaning device of food flying machines according to the present invention, a position difference sensing device 29 connected to the master controller 4 may be installed at the exterior of the outer case body 21 and can be used to detect the positions of the initial and final rotation points of the outer case body 21 thereby limiting the movement of the outer case body 21 within a safe angle range. The aforementioned position difference sensing device 29 includes a start position determination block 291, an end position determination block 292, a start sensing terminal 293 and an end sensing terminal 294, in which the start position determination block 291 and the end position determination block 292 are individually installed on the surfaces of the exterior of the outer case body 21 opposite to the support body 11, while the start sensing terminal 293 and the end sensing terminal 294 are individually installed on the surfaces of the exterior of the support body 11 opposite to the outer case body 21, such that, when the outer case body 21 rotates, if the start sensing terminal 293 detects the start position determination block 291 or alternatively the end sensing terminal 294 detects the end position determination block 292, then the master controller 4 controls the servo motor 22 to stop the rotation operation. In the present embodiment, it can be seen that, when the start sensing terminal 293 detects the start position determination block 291, the outer case body 21 is at the position of 8°, and, on the other hand, when the end sensing terminal 294 detects the end position determination block 292, the outer case body 21 is at the position of 215°, indicating that the safe angle range of the outer case body 21 is between 8°~215°, and since the outer case body 21 is restricted to fall within such a start/end angle range, the outer case body 21 can only return to the standby position by way of the reverse rotation approach so as to prevent continuous rotation actions which may adversely lead to coil or wire winding issues.

Figure 11:
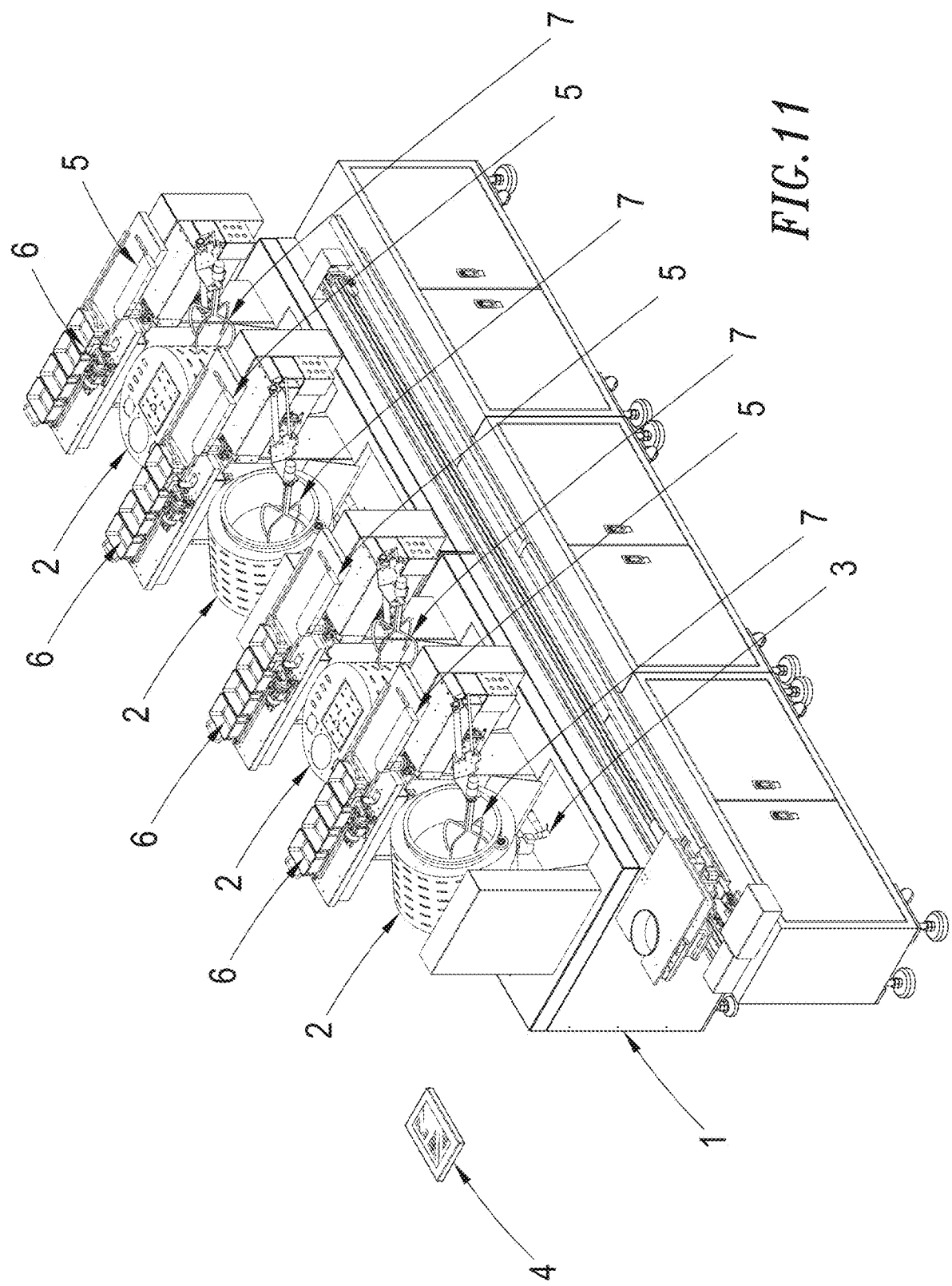
FIG. 11 shows a structural stereo view for a collective configuration of plural sets of the automatic food flying machines according to the present invention.

Moreover, referring to FIG. 11, the food flying pot 2, the material cleaning device 3, the edible fluid adding device 5, the material adding device 6 and the food flying utensil 6 of the automatic cleaning device of the food flying machine according to the present invention can be integrally installed together with multiple sets on one machine body 1 to enhance the overall production efficiency.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:

1. An automatic cleaning device of food frying machines, comprising: a machine body, including at least one support body and at least one water sink; a food frying pot, a hollow outer case body mounted on the at least one support body, in which the outer case body is pivotally installed with a servo motor which is used to memorize a rotation angle in order to control a cleaning angle of the outer case body, and the outer case body is recessively installed with a notch from the outside toward the inside, and an interior of the notch is pivotally installed with an inner frying pot whose bottom is pivotally installed with an inner pot motor, and in which a periphery of the inner frying pot is installed with a heat-resistant support board whose outside is installed in attachment with a heating coil, a temperature sensing device and at least one radiator, and the temperature sensing device is set up to sense the temperature of an outer wall of the inner frying pot through the heat-resistant support board thereby further controlling the temperature of the inner frying pot upon heating it; a cleaning device, including a water inlet externally connected to a water source, in which the water inlet is connected with at least one connection tube, a water control valve is installed on the at least one connection tube, a water outlet head is connected to an end of the at least one connection tube, and the water outlet head is fixedly installed above the at least one water sink in a way that an outlet direction of the water outlet head is upward; a master controller, respectively connected to the servo motor, the inner pot motor, the heating coil, the temperature sensing device, the radiator and the water control valve.

2. The automatic cleaning device of food frying machines according to claim 1, wherein the at least one support body is respectively installed on two sides above the at least one water sink.

3. The automatic cleaning device of food frying machines according to claim 1, wherein at least one blocking plate is installed correspondingly above the at least one water sink.

4. The automatic cleaning device of food frying machines according to claim 1, wherein at least two guide wheels are respectively installed on an edge of a notch opening, a guide board is further arranged on the edge of the notch opening in the outer case body, and the guide board is oppositely located between the at least two guide wheels.

5. The automatic cleaning device of food frying machines according to claim 1, wherein the cleaning angle ranges from 205° to 215°.

6. The automatic cleaning device of food frying machines according to claim 1, wherein an exterior of the outer case body is installed with a position difference sensing device connected to the master controller and applied to sense a start and end positions of a rotation of the outer case body in order to limit the outer case body to operate in a safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the at least one support body, and the start sensing terminal and the end sensing terminal are respectively installed on a surface of the exterior of the at least one support body in opposition to outer case body, such that, when the outer case body rotates, if the start sensing terminal detects the start position determination block, or the end sensing terminal detects the end position determination block, then the master controller controls the servo motor to stop the rotation operation.

* * * * *